United States Patent
Agrawal

(10) Patent No.: US 9,933,313 B2
(45) Date of Patent: Apr. 3, 2018

(54) METHOD FOR DETERMINING CIRCUMFERENTIAL SENSOR POSITIONING

(71) Applicant: United Technologies Corporation, Hartford, CT (US)

(72) Inventor: Rajendra K. Agrawal, Tequest, FL (US)

(73) Assignee: United Technologies Corporation, Farmington, CT (US)

( * ) Notice: Subject to any disclaimer, the term of this patent is extended or adjusted under 35 U.S.C. 154(b) by 749 days.

(21) Appl. No.: 14/478,018

(22) Filed: Sep. 5, 2014

(65) Prior Publication Data

US 2015/0068209 A1    Mar. 12, 2015

Related U.S. Application Data

(60) Provisional application No. 61/874,378, filed on Sep. 6, 2013.

(51) Int. Cl.

| | |
|---|---|
| *G01K 3/06* | (2006.01) |
| *G01M 15/14* | (2006.01) |
| *F02C 7/32* | (2006.01) |
| *G01K 1/14* | (2006.01) |
| *G01K 13/02* | (2006.01) |

(52) U.S. Cl.
CPC .............. *G01K 3/06* (2013.01); *F02C 7/32* (2013.01); *G01K 1/143* (2013.01); *G01M 15/14* (2013.01); *F05D 2220/32* (2013.01); *F05D 2230/60* (2013.01); *F05D 2260/83* (2013.01); *G01K 2013/024* (2013.01); *G01K 2205/00* (2013.01); *Y10T 29/49826* (2015.01)

(58) Field of Classification Search
CPC ...... F01D 17/02; F01D 21/003; F01D 17/085; F02C 7/32; F02C 9/28; F05D 2260/83; F05D 2270/334; F05D 2270/80; F05D 2230/60; G01K 1/146; G01K 3/02; G01K 3/06; G01M 15/14
See application file for complete search history.

(56) References Cited

U.S. PATENT DOCUMENTS 2,926,209 A * 2/1960 Cantlin .................. F01D 17/085
                                                         136/224
5,106,203 A    4/1992 Napoli et al.
(Continued)

*Primary Examiner* — Ehud Gartenberg
*Assistant Examiner* — Jason H Duger
(74) *Attorney, Agent, or Firm* — Carlson, Gaskey & Olds, P.C.

(57) ABSTRACT

A method for positioning sensors about a sensor ring includes the steps of assigning each sensor in a plurality of sensors a sensor number selected from a set of sensor numbers, where the set of sensor numbers is a whole number in the range of 0 to N, and where N is the total number of sensors in said plurality of sensors minus one, disposing a first sensor at a circumferential angular position zero on the sensor ring, and disposing each sensor in the plurality of sensors at a circumferential angular position about the sensor ring, wherein the circumferential angular position is defined by an offset from a circumferential angular position zero and the offset is equal to a base arc length between sensors multiplied by the sensor number of the sensor plus a base offset arc length multiplied by the sensor number of the sensor.

7 Claims, 4 Drawing Sheets

(56) References Cited

U.S. PATENT DOCUMENTS

| | | | | |
|---|---|---|---|---|
| 6,286,361 B1* | 9/2001 | Jones | ............... | F01D 5/18 73/24.05 |
| 6,565,255 B2 | 5/2003 | Sanderson | | |
| 7,140,186 B2* | 11/2006 | Venkateswaran | ..... | F01D 17/085 60/39.091 |
| 7,784,263 B2* | 8/2010 | Ponziani | ............... | F01D 17/02 60/39.24 |
| 8,291,712 B2 | 10/2012 | Ponziani | | |
| 9,297,707 B2* | 3/2016 | Bellis | ............... | G01K 1/026 |
| 2008/0127628 A1* | 6/2008 | Ponziani | ............... | F01D 17/02 60/204 |
| 2013/0192259 A1* | 8/2013 | Borja | ............... | F01D 5/027 60/803 |

* cited by examiner

METHOD FOR DETERMINING CIRCUMFERENTIAL SENSOR POSITIONING

This application claims priority to U.S. Provisional Application No. 61/874,378 filed Sep. 6, 2013.

TECHNICAL FIELD

The present disclosure relates generally to sensor rings, and more particularly to a method for determining radial positioning of sensors on a sensor ring.

BACKGROUND OF THE INVENTION

Gas turbine engines, such as those used in commercial aircraft, utilize a compressor, combustor and turbine section arranged sequentially in an engine core to generate thrust and propel the aircraft forward. During operation of the gas turbine engine multiple variables are measured and detected via sensors disposed circumferentially about the turbine engine. This sensor arrangement is referred to as a sensor ring. The sensed variables can include turbine exhaust temperatures, exhaust pressures, or any other necessary variable. While the instant disclosure discusses turbine exhaust variables specifically, it is understood that the same method can be applied to any similar system including augmenter inlets and exhausts.

One metric measured during operation of the gas turbine engine is the turbine exhaust temperature and/or the power turbine inlet temperature. These temperature measurements are utilized to ensure that the gas turbine engine operates within the allowable safe average temperature limits of the engine. When the turbine engine exceeds the allowable safe average temperature for longer than a pre-defined period of time, the turbine engine must be removed from the wing and undergo maintenance or be replaced. As described above, these temperature measurements are typically made using multiple temperature sensors that are disposed evenly circumferentially about a sensor ring at the turbine exhaust or at the power turbine inlet. This measurement scheme provides an "average" temperature of the gasses passing through the turbine exhaust or the power turbine inlet.

In practice, turbine engine designs utilize multiple fuel nozzles disposed circumferentially about a combustor to inject fuel into the combustor. As a result of the fuel nozzle placement, the temperature profile at the turbine exhaust or at the power turbine inlet is not even circumferentially. As the sensors are disposed evenly circumferentially, and the temperature profile is not even circumferentially, the determined average is skewed, and can be off by as much as 150-200 degrees Fahrenheit.

SUMMARY OF THE INVENTION

A gas turbine engine according to an exemplary embodiment of this disclosure, among other possible things includes a compressor section, a combustor fluidly connected to the compressor section via a core flow path, the combustor including a plurality of fuel nozzles and the plurality of fuel nozzles are disposed evenly circumferentially about the combustor, a turbine section fluidly connected to the combustor section via the core flow path, a plurality of sensors disposed circumferentially about the core flow path, each sensor in the plurality of sensors has a sensor number selected from a set of sensor numbers, where the set of sensor numbers is a whole number in the range of 0 to N, where N is the total number of sensors in the plurality of sensors minus one, and each sensor of the plurality of sensors is offset circumferentially from a circumferential angular position zero the offset is equal to a base arc length between sensors multiplied by the sensor number of the sensor plus a base offset arc length multiplied by the sensor number of the sensor.

In a further embodiment of the foregoing gas turbine engine, the base arc length between sensors is 360 divided by the quantity of sensors in the plurality of sensors.

In a further embodiment of the foregoing gas turbine engine, the base offset arc length is a nozzle arc length divided by the quantity of sensors in the plurality of sensors.

In a further embodiment of the foregoing gas turbine engine, the nozzle arc length is 360 divided by the number of fuel nozzles.

In a further embodiment of the foregoing gas turbine engine, each sensor in the plurality of sensors has a unique whole number in the range of 0 to N.

In a further embodiment of the foregoing gas turbine engine, the number of fuel nozzles is 16 and the nozzle arc length is approximately 22.5 degrees.

In a further embodiment of the foregoing gas turbine engine, the number of sensors is 7 and the base arc length is approximately 51.4 degrees.

In a further embodiment of the foregoing gas turbine engine, the base offset arc length is approximately 3.21 degrees.

A sensor ring for determining an average sensed value about the ring according to an exemplary embodiment of this disclosure, among other possible things includes a plurality of sensors disposed circumferentially about the sensor ring, each sensor in the plurality of sensors has a sensor number selected from a set of sensor numbers, where the set of sensor numbers is a whole number in the range of 0 to N, where N is the total number of sensors in the plurality of sensors minus one, and each sensor of the plurality of sensors being offset circumferentially from a circumferential angular position zero the offset is equal to a base arc length between sensors multiplied by the sensor number of the sensor plus a base offset arc length multiplied by the sensor number of the sensor.

In a further embodiment of the foregoing sensor ring, the base arc length between sensors is 360 divided by the quantity of sensors in the plurality of sensors.

In a further embodiment of the foregoing sensor ring, the base offset arc length is a peak to peak arc length divided by the quantity of sensors in the plurality of sensors.

In a further embodiment of the foregoing sensor ring, the peak to peak arc length is 360 divided by the number of peaks of a sensed value disposed circumferentially about the ring.

In a further embodiment of the foregoing sensor ring, each sensor in the plurality of sensors has a unique whole number in the range of 0 to N.

In a further embodiment of the foregoing sensor ring, the base offset arc length is a peak to peak arc length divided by the whole number factor of the quantity of sensors in the plurality of sensors.

A method for positioning sensors about a sensor ring according to an exemplary embodiment of this disclosure, among other possible things includes assigning each sensor in a plurality of sensors a sensor number selected from a set of sensor numbers, where the set of sensor numbers is a whole number in the range of 0 to N, where N is the total number of sensors in the plurality of sensors minus one disposing a first sensor at a circumferential angular position zero on the sensor ring, disposing each sensor in the plurality of sensors at a circumferential angular position about the sensor ring, the circumferential angular position is defined by an offset from a circumferential angular position zero and the offset is equal to a base arc length between sensors multiplied by the sensor number of the sensor plus a base offset arc length multiplied by the sensor number of the sensor.

A further embodiment of the foregoing method includes the step of determining the base arc length between sensors by dividing 360 by the number of sensors.

A further embodiment of the foregoing method includes the step of determining the base offset arc length for each sensor by dividing a peak to peak arc length by the quantity of sensors in the plurality of sensors.

A further embodiment of the foregoing method includes the step of determining the peak to peak arc length by dividing 360 by a total number of expected peaks disposed circumferentially about the ring of the value to be sensed.

These and other features of the present invention can be best understood from the following specification and drawings, the following of which is a brief description.

DETAILED DESCRIPTION OF AN EMBODIMENT

Figure 1:
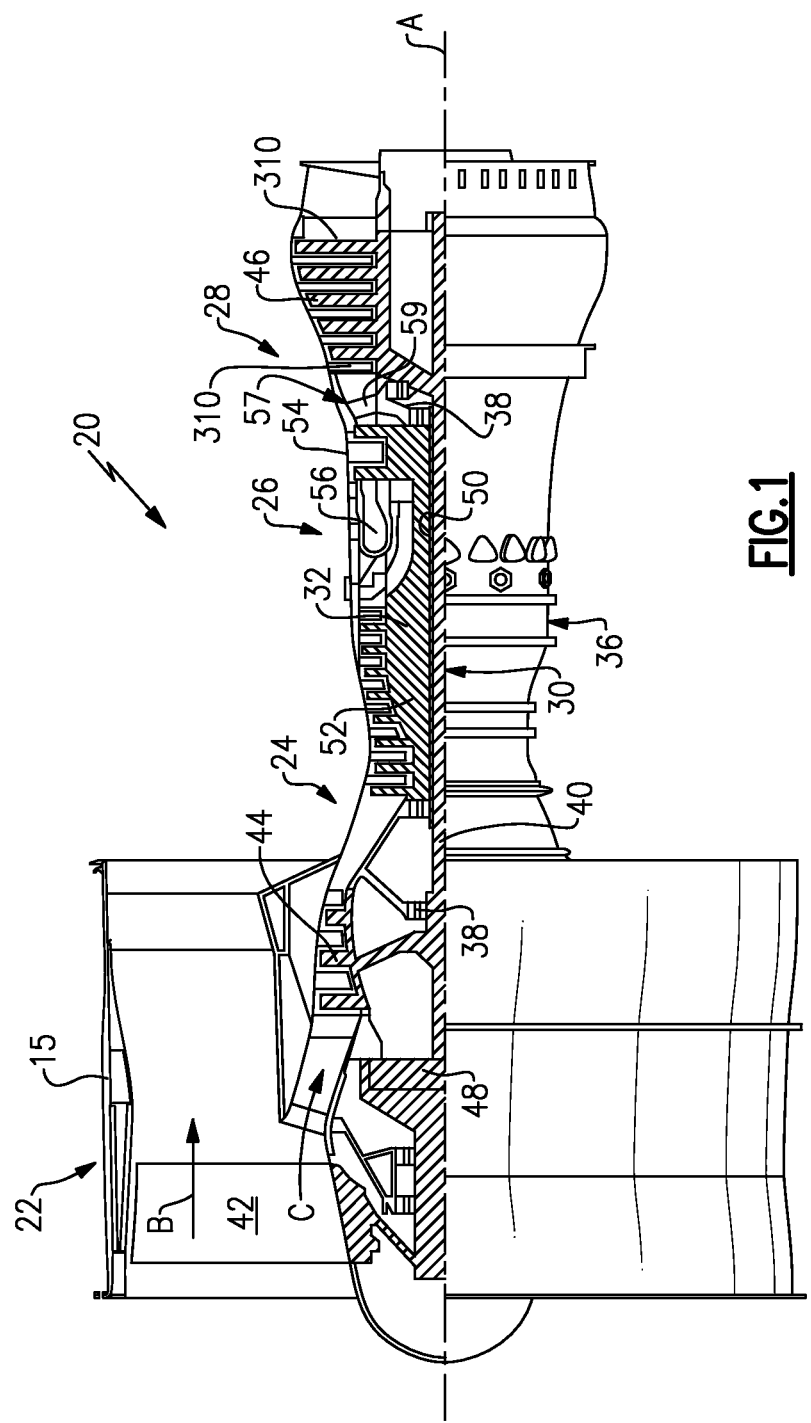
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is directly connected to the fan 42 or connected through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans, turbojets, turboshafts and turboprop engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
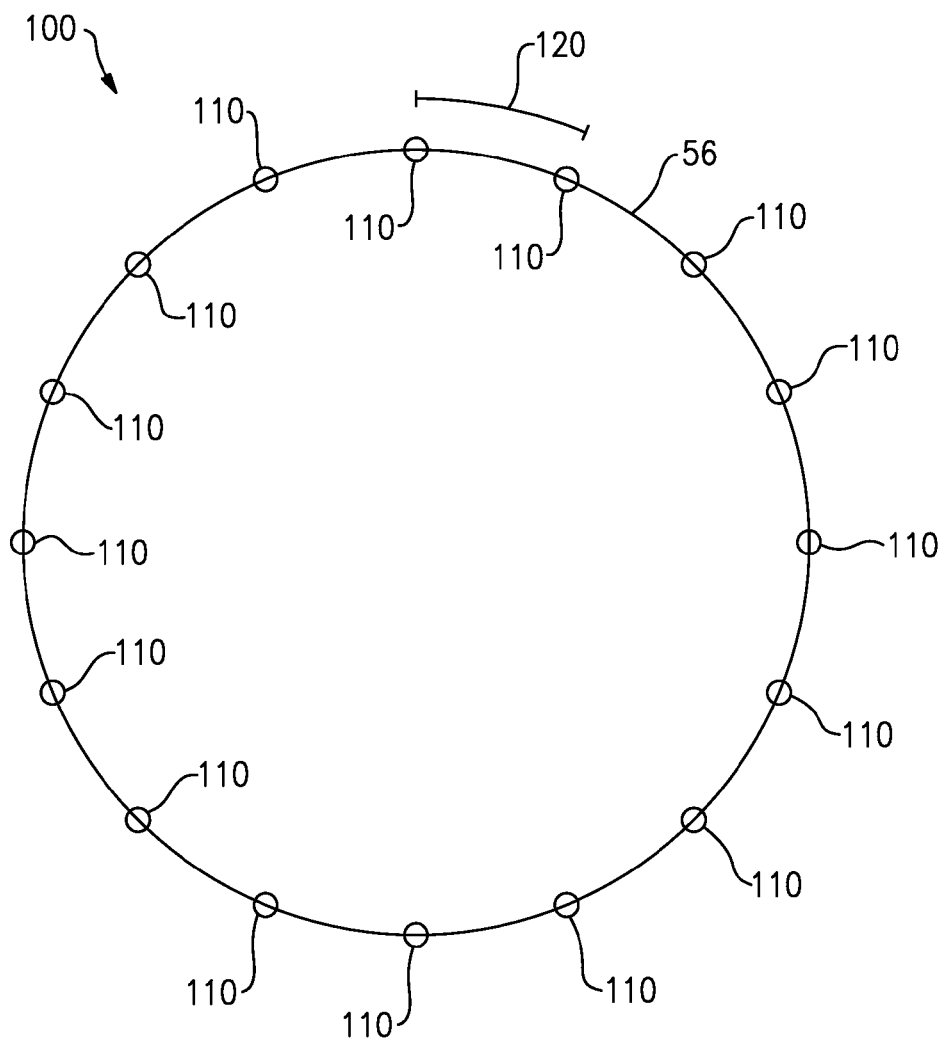
FIG. 2 schematically illustrates a fuel nozzle arrangement for the gas turbine engine of FIG. 1.

FIG. 2 schematically illustrates a fuel nozzle arrangement 100 about the combustor 56 of the gas turbine engine 20 of FIG. 1. The illustrated combustor 56 includes sixteen fuel nozzles 110 arranged circumferentially about the combustor 56. The fuel nozzles 110 inject fuel into the combustor 56 according to known turbine engine practices. The fuel nozzles 110 are spaced evenly circumferentially about the combustor 56. A fuel nozzle arc length 120 from each fuel nozzle 110 to each adjacent fuel nozzle 110 is determined by dividing 360 degrees by sixteen (the total number of fuel nozzles 110.) In the example utilizing sixteen fuel nozzles, the fuel nozzle arc length 120 is approximately 22.5 degrees. Thus, each fuel nozzle 110 is spaced 22.5 degrees from each adjacent fuel nozzle 110 about the circumference of the combustor 56.

In similar sensor arrangements, not directed toward sensing the temperature of combustion products, the "fuel nozzle" locations are referred to as peak locations, and are located at each circumferential location where the sensed characteristic is at a peak value. Similarly, the arc length from each peak to each adjacent peak (the fuel nozzle arc length 120 in the illustrated example) is referred to as the peak to peak arc length, and is 360 degrees divided by the total number of peaks.

Each of the fuel nozzles 110 injects fuel into the combustor 56 in a discrete location, and the fuel spreads out from that location before being combusted. As a result of this arrangement, the fuel is most heavily concentrated at each of the fuel nozzle 110 locations, and has the lowest concentration at the midpoints between each of the fuel nozzles 110. The lower fuel concentration results in less combustion and a lower gas temperature at the mid-point, with a temperature gradient that increases as you approach the fuel nozzle locations. The resulting temperature profile is that of a waveform, and is sinusoidal in nature. A similar characteristic profile can be seen in non-fuel nozzle configurations having peaks and valleys.

Figure 3:
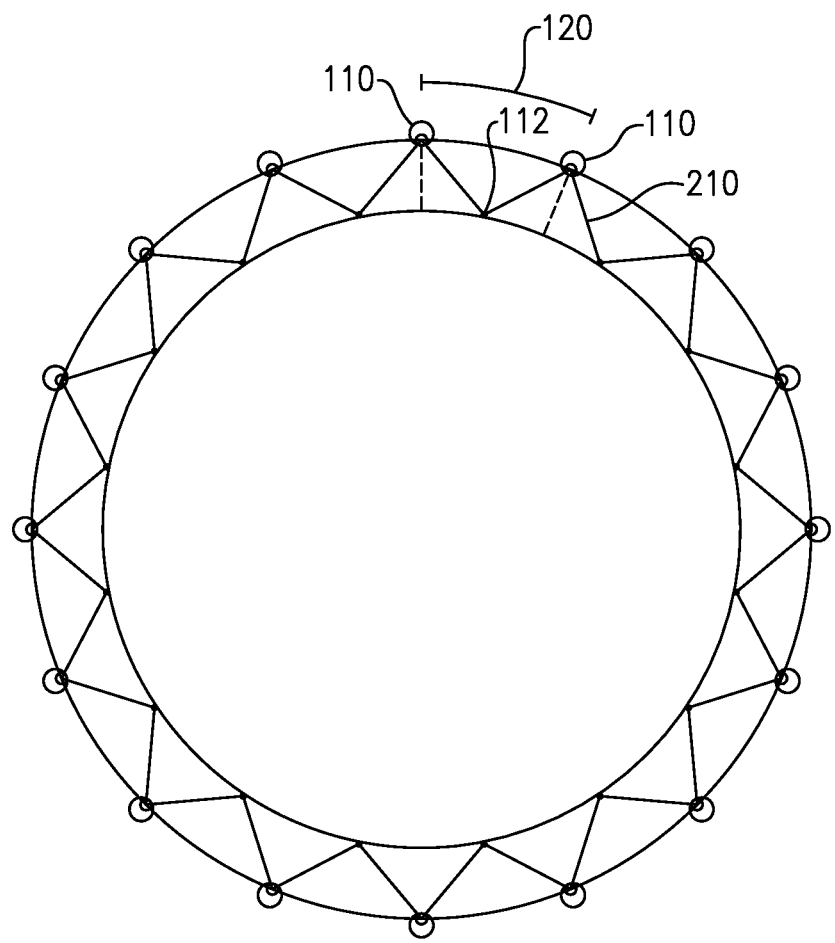
FIG. 3 schematically illustrates a temperature profile of power turbine inlet gasses originating from a combustor.

With continued reference to FIG. 2, and with like numerals indicating like elements, FIG. 3 illustrates an example temperature profile 210 of the exhaust gasses from the fuel nozzle arrangement of FIG. 2. The temperature profile illustrated in FIG. 3 is a triangle waveform with the temperature at its peak at each of the fuel nozzles 110, and at its minimum at a point 112 equidistant from, and between, each of the fuel nozzles 110. While the temperature profile in the illustrated example is a triangle wave, it is understood that the profile can be any profile having a repeating waveform, including a sinusoidal waveform and the illustrated triangle waveform and the below described sensor arrangement will still be applicable.

Figure 4:
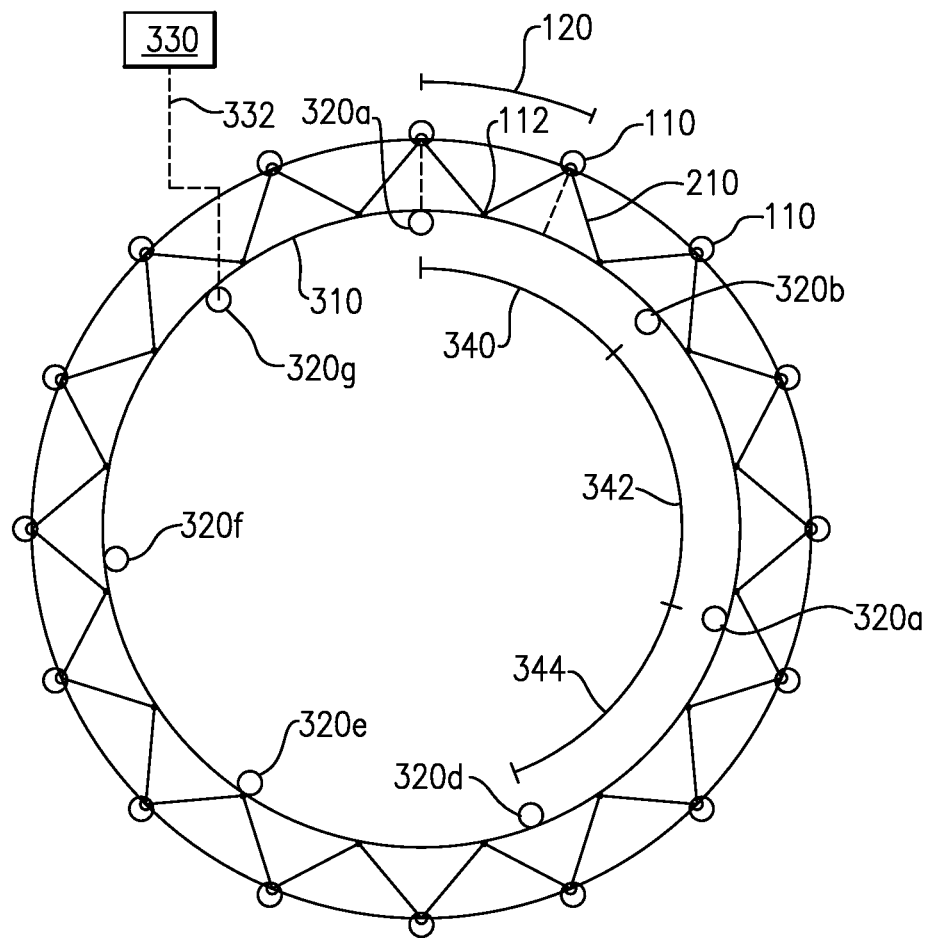
FIG. 4 schematically illustrates a sensor ring for a power turbine inlet of the gas turbine engine of FIG. 1.

In order to ensure that the gas turbine engine 20 operates within the allowable safe temperature limits of the engine 20, a sensor ring 310 is placed at either a turbine section exhaust or a power turbine inlet portion and detects the temperature of the gas passing through the ring 310. With continued reference to FIGS. 2 and 3, and with like numerals indicating like elements, FIG. 4 illustrates a sensor ring 310 including seven sensors 320a-g (alternately referred to as probes) disposed circumferentially about the sensor ring 310. The sensors 320a-g each measure the temperature at the sensor 320a-g location and report the sensed values to a controller 330. The controller 330 is connected to each of the sensors 320a-g via a physical connection 332. In alternate examples, a wireless connection between the sensors 320a-g and the controller 330 can be utilized.

The controller 330 determines the average sensed temperature from all the sensors 320a-g, and defines that temperature as the average temperature of the combustor gasses. When the sensors 320a-g are distributed evenly circumferentially about sensor ring 310, that is to say an arc length 340 between each of the sensors 320a-g and each adjacent sensor 320a-g is equal as in the prior art, the sensed positions on the temperature profile waveform 210 do not net a true average value of the temperature. In order to account for this factor, the arc lengths 340, 342, 344, etc between each sensor 320a-g and the adjacent sensors 320a-g varies from sensor 320a-g to sensor 320a-g according to a mathematically derived angular offset.

The variance between the arc lengths 340, 342, 344 is a base sensor arc length of 360 degrees divided by the number of sensors 320a-g (360 degrees divided by 7=51.4 degrees for the illustrated example) plus an arc length offset value of the fuel nozzle arc length 120 divided by the number of sensors 320a-g (22.5 degrees divided by 7=3.21 degrees for the illustrated example.) Thus, each sensor 320a-g is offset from the previous adjacent sensor by 54.61 degrees.

Described below is a method for determining the particular circumferential positions of each sensor 320a-g relative to a set angular position zero rather than positioning the sensors uniformly around the circumference.

An initial sensor 320a is placed at a circumferential angular position that is arbitrarily assigned as zero degrees (position zero.) Each sensor 320a-g is also assigned a sensor number from 0 to n, where n is the total number of sensors 320a-g minus one. Each sequential sensor 320b-g is offset circumferentially from the angular position zero by an arc length defined as a base sensor arc length plus an arc length offset value multiplied by the corresponding assigned sensor number. The base sensor arc length is 360 degrees divided by the total number of sensors 320a-g on the sensor ring 310 and the arc length offset value is defined as the fuel nozzle arc length 120 (alternately referred to as the peak to peak arc length) divided by the number of sensors 320a-g.

Thus, in the sixteen fuel nozzle 110, seven probe 320a-g example illustrated in the figures, the first sensor 320a is assigned sensor number zero and is located at the circumferential angular position zero (the base sensor arc length times zero plus the arc length offset times zero is zero degrees.) The second sensor 320b is assigned sensor number one and is offset from the angular position zero by approximately 54.61 degrees (the base arc length of 51.4 degrees times one plus the arc length offset of 3.21 degrees times one). The third sensor 320c is assigned sensor number two, and is offset from angular position zero by approximately 109.22 degrees (the base arc length of 51.4 degrees times two plus the arc length offset of 3.21 degrees times two.) The angular position of each sensor 320a-g is determined similarly.

By positioning the sensors 320a-g using the above described circumferential positioning schemes, the sensors 320a-g are placed at distributed relative positions on the waveform 210. In contrast, locating the sensors 320a-g evenly circumferentially can result in the sensors 320a-g sensing the same relative positions on the waveform 210. Thus, the average sensed value of the sensors 320a-g in the above described circumferential distribution is a truer average value than can be achieved by distributing the sensors 320a-g evenly about the sensor ring 310.

One of skill in the art, having the benefit of this disclosure will also recognize that the base offset arc length can be the peak to peak arc length divided by a whole number factor of the total number of sensors 320a-g, rather than the total number of sensors 320a-g and achieve similar results. Using a whole number factor of the total number of sensors decreases the number of relative positions being sensed on the waveform and causes each relative position to be sensed at least twice. The number of times each relative position is sensed is dependent on the particular whole number factor utilized.

While the above descriptions and Figures are directed toward a temperature sensor for detecting an average temperature in a gas turbine engine, it is understood that the method for determining sensor positioning, and the corresponding sensor ring can be applied to any circumferential sensor arrangement where the sensed characteristics has a waveform shaped profile, and is not limited to combustor temperature sensor rings. Similarly, while the above described arrangement utilizes sixteen peak sensed characteristic locations, and seven sensor locations, one of skill in the art, having the benefit of this disclosure, can apply the disclosure to an arrangement having any number of peak locations and any number of sensors, while still remaining within the disclosed invention.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section;
a combustor fluidly connected to the compressor section via a core flow path, the combustor including a plurality of fuel nozzles having a total number of fuel nozzles, the plurality of fuel nozzles are disposed evenly circumferentially about the combustor;
a turbine section fluidly connected to the combustor via the core flow path;
a plurality of sensors having a total number of sensors, the plurality of sensors disposed circumferentially about the core flow path, the total number of sensors is not equal to the total number of fuel nozzles;
each sensor in said plurality of sensors has a respective sensor number selected from a set of sensor numbers, where each respective sensor number in the set of sensor numbers is a unique whole number in a range of 0 to N, where N is equal to the total number of sensors minus one; and
each sensor of said plurality of sensors is positioned at a respective circumferential offset relative to a circumferential angular position zero, wherein the respective circumferential offset is equal to a base arc length multiplied by the respective sensor number of the sensor plus a base offset arc length multiplied by the respective sensor number of the sensor, the base arc length is 360 degrees divided by the total number of sensors, the base offset arc length is a nozzle arc length divided by the total number of sensors, and the nozzle arc length is 360 degrees divided by the total number of fuel nozzles, wherein the circumferential angular position zero is a circumferential angular position of one of the plurality of fuel nozzles.

2. The gas turbine engine of claim 1, wherein the total number of fuel nozzles is 16.

3. The gas turbine engine of claim 1, wherein the total number of sensors is 7.

4. The gas turbine engine of claim 1, wherein the base offset arc length is approximately 3.21 degrees.

5. The gas turbine engine of claim 1, wherein the nozzle arc length is an arc length from each fuel nozzle to each adjacent fuel nozzle in the plurality of fuel nozzles.

6. A sensor ring for determining an average sensed value about the sensor ring comprising:
a plurality of sensors disposed circumferentially about said sensor ring for measuring a parameter, the plurality of sensors having a total number of sensors;
wherein the sensor ring has a plurality of expected peaks disposed circumferentially about said sensor ring, wherein each of the plurality of expected peaks corresponds to an expected local peak value of the parameter, the plurality of expected peaks having a total number of expected peaks;
wherein each sensor in said plurality of sensors has a respective sensor number selected from a set of sensor numbers, where each respective sensor number in the set of sensor numbers is a unique whole number in the range of 0 to N, where N is equal to the total number of sensors minus one; and
each sensor of said plurality of sensors is positioned at a respective circumferential offset relative to a circumferential angular position zero, wherein the respective circumferential offset is equal to a base arc length multiplied by the respective sensor number of the sensor plus a base offset arc length multiplied by the respective sensor number of the sensor, the base arc length is equal to 360 degrees divided by the total number of sensors, the base offset arc length is equal to a peak to peak arc length divided by the total number of sensors, and the peak to peak arc length is equal to 360 degrees divided by the total number of expected peaks; and
the total number of sensors is not equal to the total number of expected peaks, wherein the circumferential angular position zero is a circumferential angular position of one of the plurality of expected peaks.

7. A method for positioning a plurality of sensors about a sensor ring for measuring a parameter, the sensor ring having a plurality of expected peaks disposed circumferentially about said sensor ring, wherein each of the plurality of expected peaks corresponds to an expected local peak value of the parameter, the plurality of sensors having a total number of sensors and the plurality of expected peaks having a total number of expected peaks, the method comprising the steps of:
assigning each sensor in the plurality of sensors a respective sensor number selected from a set of sensor numbers, where each respective sensor number in the set of sensor numbers is a unique whole number in the range of 0 to N, where N is the total number of sensors minus one;
disposing each sensor in said plurality of sensors at a respective circumferential angular position about said sensor ring, wherein the respective circumferential angular position is defined by a respective circumferential offset relative to a circumferential angular position zero, the respective circumferential offset is equal to a base arc length multiplied by the respective sensor number of the sensor plus a base offset arc length multiplied by the respective sensor number of the sensor, the base arc length is equal to 360 degrees divided by the total number of sensors, the base offset arc length is equal to a peak to peak arc length divided by the total number of sensors, and the peak to peak arc length is equal to 360 degrees divided by the total number of expected peaks; and the total number of sensors is not equal to the total number of expected peaks, wherein the circumferential angular position zero is a circumferential angular position of one of the plurality of expected peaks.

* * * * *